United States Patent
Ryu et al.

(10) Patent No.: US 10,670,469 B2
(45) Date of Patent: Jun. 2, 2020

(54) METHOD FOR CONTROLLING BATTERY CHARGING AND ELECTRONIC DEVICE THEREFOR

(71) Applicant: SAMSUNG ELECTRONICS CO., LTD., Suwon-si, Gyeonggi-do (KR)

(72) Inventors: Sanghyun Ryu, Suwon-si (KR); Ku-Chul Jung, Suwon-si (KR); Kangjun Ko, Seoul (KR); Hyundeok Seo, Hwaseong-si (KR); Minjeong Lee, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/096,513

(22) PCT Filed: Feb. 17, 2017

(86) PCT No.: PCT/KR2017/001740
§ 371 (c)(1),
(2) Date: Oct. 25, 2018

(87) PCT Pub. No.: WO2017/188577
PCT Pub. Date: Feb. 11, 2017

(65) Prior Publication Data
US 2019/0145833 A1    May 16, 2019

(30) Foreign Application Priority Data
Apr. 25, 2016 (KR) .................. 10-2016-0050063

(51) Int. Cl.
*G01K 1/02* (2006.01)
*H01M 10/44* (2006.01)
(Continued)

(52) U.S. Cl.
CPC ............. *G01K 1/022* (2013.01); *G01K 1/02* (2013.01); *H01M 10/443* (2013.01);
(Continued)

(58) Field of Classification Search
CPC ....... G01K 1/02; G01K 1/022; H01M 10/443; H01M 10/486; H02J 7/00; H02J 7/0091;
(Continued)

(56) References Cited

U.S. PATENT DOCUMENTS

2009/0085527 A1* 4/2009 Odaohhara ........... H02J 7/0091
320/150
2010/0203928 A1   8/2010 Lopata
(Continued)

FOREIGN PATENT DOCUMENTS

KR    10-2012-0071074    7/2012
KR    10-2013-0093525    8/2013
(Continued)

OTHER PUBLICATIONS

Extended Search Report dated Feb. 11, 2019 in counterpart European Patent Application No. EP17789762.6.
(Continued)

*Primary Examiner* — Omer S Khan
(74) *Attorney, Agent, or Firm* — Nixon & Vanderhye, P.C.

(57) ABSTRACT

Various embodiments of the present invention relate to an apparatus and a method for controlling battery charging in an electronic device. The electronic device comprises a plurality of temperature sensors disposed at different positions, a battery, a memory, at least one processor, and a charging module for controlling charging of the battery, wherein the charging module may be configured to identify a charging type of the battery, to select at least one temperature sensor among the plurality of the temperature (Continued)

sensors based on the charging type of the battery, and to control a charging current of the battery based on a temperature measured through the at least one temperature sensor. Other embodiments may be possible.

12 Claims, 10 Drawing Sheets

(51) Int. Cl.
  *H02J 7/00* (2006.01)
  *H02J 7/04* (2006.01)
  *H02J 7/02* (2016.01)
  *H01M 10/48* (2006.01)
(52) U.S. Cl.
  CPC ............ *H01M 10/486* (2013.01); *H02J 7/00* (2013.01); *H02J 7/0091* (2013.01); *H02J 7/007192* (2020.01); *H02J 7/02* (2013.01); *H02J 7/04* (2013.01); *Y02B 40/90* (2013.01)
(58) Field of Classification Search
  CPC ..... H02J 7/02; H02J 7/04; H02J 7/047; Y02B 40/90
  See application file for complete search history.

(56) References Cited

U.S. PATENT DOCUMENTS

| | | | |
|---|---|---|---|
| 2011/0050164 A1* | 3/2011 | Partovi | .................. H01F 5/003 320/108 |
| 2011/0291613 A1 | 12/2011 | Rosik et al. | |
| 2014/0272500 A1 | 9/2014 | Roumi et al. | |
| 2015/0229155 A1 | 8/2015 | Sporck et al. | |
| 2016/0056664 A1 | 2/2016 | Partovi | |

FOREIGN PATENT DOCUMENTS

| | | |
|---|---|---|
| KR | 10-2015-0129575 | 11/2015 |
| WO | 2012/047779 | 4/2012 |

OTHER PUBLICATIONS

International Search Report for PCT/KR2017/001740, dated May 23, 2017, 11 pages.

Written Opinion of the ISA for PCT/KR2017/001740, dated May 23, 2017, 6 pages.

* cited by examiner

METHOD FOR CONTROLLING BATTERY CHARGING AND ELECTRONIC DEVICE THEREFOR

This application is the U.S. national phase of International Application No. PCT/KR2017/001740 filed 17 Feb. 2017, which designated the U.S. and claims priority to KR Patent Application No. 10-2016-0050063 filed 25 Apr. 2016, the entire contents of each of which are hereby incorporated by reference.

TECHNICAL FIELD

Various embodiments of the present invention relate to an apparatus and a method for controlling battery charging in an electronic device.

BACKGROUND AND SUMMARY

A portable electronic device such as a tablet computer, a smart phone may use a rechargeable battery as a power supply means to provide mobility. Accordingly, a user of the portable electronic device may use the electronic device more conveniently beyond a wired environment for power supply of the electronic device.

The portable electronic device may charge the battery through external power supplied by wire or wirelessly.

A portable electronic device may control charging of a battery based on heat generated by the battery charging through an application processor (AP). For example, if charging the battery in the electronic device of an active state, the AP may control a constant charging current of the battery to limit the heat generated by the battery charging. For example, if charging the battery in the electronic device of an inactive state, the AP may control the charging current of the battery by identifying a temperature of a temperature sensor at each activation period (e.g., 30 seconds). That is, the AP may control the battery charging current so that the temperature of the temperature sensor identified at each activation period does not exceed a reference temperature. For example, the electronic device of the active state may include an electronic device of which a display is activated or which provides a communication service. The electronic device of the inactive state may include an electronic device of which the display is inactive or turned off.

However, as the portable electronic device controls the battery charging using the AP, a battery charging efficiency corresponding to a temperature change of the electronic device may be degraded. For example, in the battery charging for the active electronic device, the AP limits the battery charging current to be constant so as to limit the heat and accordingly a charging rate may decrease. In addition, in the battery charging for the inactive electronic device, the AP limits the battery charging current such that the temperature of the temperature sensor does not exceed the reference temperature during the activation period and accordingly the charging rate may decrease.

Various embodiments of the present invention may provide an apparatus and a method for controlling the battery charging based on the temperature change of the electronic device in the electronic device.

According to various embodiments of the present invention, an electronic device may include a plurality of temperature sensors disposed at different positions, a battery, a memory, at least one processor, and a charging module for controlling charging of the battery, wherein the charging module may be configured to identify a charging type of the battery, to select at least one temperature sensor among the plurality of the temperature sensors based on the charging type of the battery, and to control a charging current of the battery based on a temperature measured through the at least one temperature sensor.

According to various embodiments of the present invention, an operating method of an electronic device may include identifying a battery charging type of the electronic device, selecting at least one temperature sensor among a plurality of temperature sensors disposed at positions in the electronic device based on the battery charging type, and controlling a charging current of the battery based on a temperature measured through the at least one temperature sensor.

An electronic device and its operating method according to various embodiments may, by controlling battery charging so as to respond to temperature change of the electronic device in a charging module, reduce load of an application processor and improve a battery charging efficiency by adaptively controlling a battery charging current in response to the temperature change.

DETAILED DESCRIPTION OF EXAMPLE EMBODIMENTS

Figure 1:
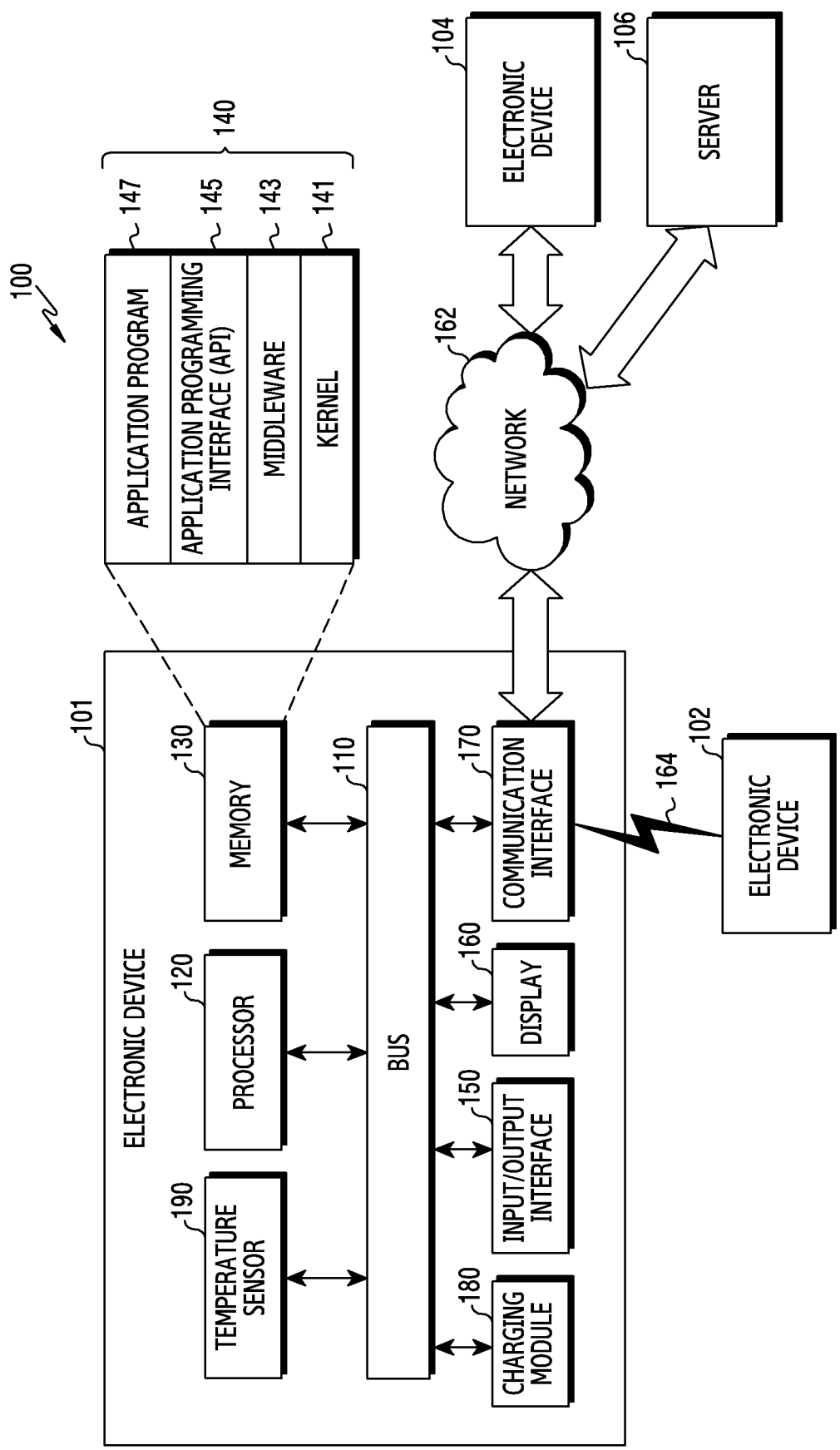
FIG. 1 illustrates an electronic device in a network environment in various embodiments of the present invention.

Hereinafter, various exemplary embodiments of the present document are described with reference to the accompanying drawings. It should be understood, however, that it is not intended to limit the various exemplary embodiments of the present document to the particular form disclosed, but, on the contrary, it is intended to cover all modifications, equivalents, and alternatives falling within the spirit and scope of the various exemplary embodiments of the present document. Like reference numerals denote like components throughout the drawings. A singular expression includes a plural concept unless there is a contextually distinctive difference therebetween.

In the present document, an expression "A or B", "A and/or B", or the like may include all possible combinations of items enumerated together. Although expressions such as "1st", "2nd", "first", and "second" may be used to express corresponding constitutional elements, it is not intended to limit the corresponding constitutional elements. When a certain (e.g., 1st) constitutional element is mentioned as being "operatively or communicatively coupled with/to" or "connected to" a different (e.g., 2nd) constitutional element, the certain constitutional element is directly coupled with/to another constitutional element or can be coupled with/to the different constitutional element via another (e.g., 3rd) constitutional element.

An expression "configured to" used in the present document may be interchangeably used with, for example, "suitable for", "having the capacity to", "adapted to", "made to", "capable of", or "designed to" in a hardware or software manner according to a situation. In a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., Central Processing Unit (CPU) or an application processor) capable of performing corresponding operations by executing one or more software programs stored in a memory device.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to some embodiments, the electronic device (ex. home appliance) may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology. Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

In the following descriptions, battery charging may include a series of operations for storing energy (e.g., chemical energy) in a battery using external power supplied through at least one of a wireless connection or a wired connection.

FIG. 1 illustrates an electronic device 101 in a network environment 100 in various embodiments of the present invention.

Referring to FIG. 1, the electronic device 101 may include a bus 110, a processor 120, a memory 130, an input/output interface 150, a display 160, and a communication interface 170. In some embodiments, the electronic device 101 may omit at least one of the elements, or may further include other elements.

The bus 110 may include, for example, a circuit which interconnects the elements 120 to 170 and delivers communication (e.g., a control message and/or data) between the elements.

The processor 120 may include one or more of a central processing unit (CPU), an application processor (AP), an image signal processor (ISP), and a communication processor (CP). The processor 120, for example, may carry out operations or data processing relating to the control and/or communication of at least one other element of the electronic device 101.

The memory 130 may include a volatile and/or non-volatile memory. The memory 130 may store, for example, command or data relevant to at least one other element of the electronic device 101. According to an embodiment, the memory 130 may store software and/or a program 140. For example, The program 140 may include, for example, a kernel 141, middleware 143, an application programming interface (API) 145, or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for executing an operation or function implemented by other programs (e.g., the middleware 143, the API 145, or the application programs 147). Furthermore, the kernel 141 may provide an interface by which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data. The middleware 143 may process one or more task requests received from the application programs 147 according to the priorities thereof. For example, the middleware 143 may assign priorities to use the system resources (e.g., the bus 210, the processor 120, the memory 130, or the like) of the electronic device 101 to one or more of the application programs 147, and may process the one or more task requests. The API 145 is an interface used by the application programs 147 to control a function provided from the kernel 141 or the middleware 143, and may include, for example, at least one interface or function (e.g., an instruction) for file control, window control, image processing, a character control, or the like.

According to an embodiment, the memory 130 may store a control temperature of the temperature sensor 190 for controlling battery charging according to a temperature of the electronic device. For example, if a plurality of the temperature sensors 190 exists at different positions, the memory 130 may store the control temperature for each temperature sensor 190. For example, the control temperature may indicate a temperature of the temperature sensor 190 which matches a surface temperature of the electronic device 101, which is set to prevent an error of the electronic device 101. Thus, the control temperature of the temperature sensor 190 may be set differently for each position of the temperature sensor 190.

The input/output interface 150 may function as, for example, an interface that can forward commands or data, which are input from a user or an external device, to the other element(s) of the electronic device 101.

The display 160 may include, for example, a liquid crystal display (LCD), a light-emitting diode (LED) display, an organic light-emitting diode (OLED) display, or a microelectromechanical Systems (MEMS) display, or an electronic paper display. The display 160 may display, for example, various contents (e.g., texts, images, videos, icons, and/or symbols) to the user. The display 160 may include a touch screen, and may receive, for example, a touch, a gesture, proximity, or a hovering input using an electronic pen or a user's body part.

The communication interface 170 may establish communication, for example, between the electronic device 101 and an external device (e.g., a first external electronic device 102, a second external electronic device 104, or a server 106). For example, the communication interface 170 may be connected to a network 162 through wireless communication or wired communication, and communicate with the external device (e.g., the second external electronic device 104 or the server 106).

The wireless communication may include cellular communication using at least one of, for example, long term evolution (LTE), LTE-advance (LTE-A), code division multiple access (CDMA), Wideband CDMA (WCDMA), universal mobile telecommunications system (UMTS), wireless broadband (WiBro), or global system for mobile communications (GSM). According to an embodiment, the wireless communication may include at least one of, for example, wireless fidelity (WiFi), Bluetooth, Bluetooth low energy (BLE), Zigbee, near field communication (NFC), magnetic secure transmission (MST), radio frequency (RF), or body area network (BAN). According to an embodiment, the wireless communication may include GNSS. The GNSS may include, for example, a global positioning system (GPS), a global navigation satellite system (Glonass), Beidou navigation satellite system (Beidou) or Galileo, the European global satellite-based navigation system. Hereinafter, in the present disclosure, "GPS" may be interchangeably used with "GNSS". The wired communication may include, for example, at least one of a universal serial bus (USB), a high definition multimedia interface (HDMI), recommended standard 232 (RS-232), power line communication, or a plain old telephone service (POTS). The network 162 may include a telecommunication network, for example, at least one of a computer network (e.g., a local area network (LAN) or a wide area network (WAN)), the Internet, or a telephone network.

The first and second external electronic devices 102 and 104 each may be of the same or different type from the electronic device 101. According to various embodiments, all or some of the operations performed at the electronic device 101 may be executed in another one or a plurality of electronic devices (e.g., the electronic devices 102 and 104 or the server 106). According to an embodiment, if the electronic device 101 has to perform some functions or services automatically or in response to a request, the electronic device 101 may request another device (e.g., the electronic device 102 or 104 or the server 106) to execute at least some functions relating thereto, instead of or in addition to autonomously performing the functions or services. The another device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

The charging module 180 may control the battery charging of the electronic device 101. For example, the charging module 180 may supply external power provided by wire or wirelessly, to the battery of the electronic device 110 and thus charge a corresponding battery.

According to an embodiment, the charging module 180 may regulate a charging current of the battery based on a temperature detected through the temperature sensor 190. For example, the charging module 180 may regulate the charging current of the battery based on the temperature measured through the temperature sensor 190 corresponding to a charging type (e.g., wire or wireless) of the electronic device 101. For example, if the temperature detected through the temperature sensor 190 is higher than a control temperature of the corresponding temperature sensor 190, the charging module 180 may decrease the charging current of the battery. That is, if the temperature detected through the temperature sensor 190 is higher than the control temperature of the corresponding temperature sensor 190, the charging module 180 may reduce or block the current supplied to the battery.

The temperature sensor 190 may include a plurality of temperature sensors disposed at different positions. For example, the temperature sensor 190 may provide the temperature measured at the position of the corresponding temperature sensor 190 to the charging module 180. For example, the temperature sensor 190 may be disposed to be adjacent to or physically contact at least one of the charging module 180, a wireless power module, and the battery.

Figure 2A:
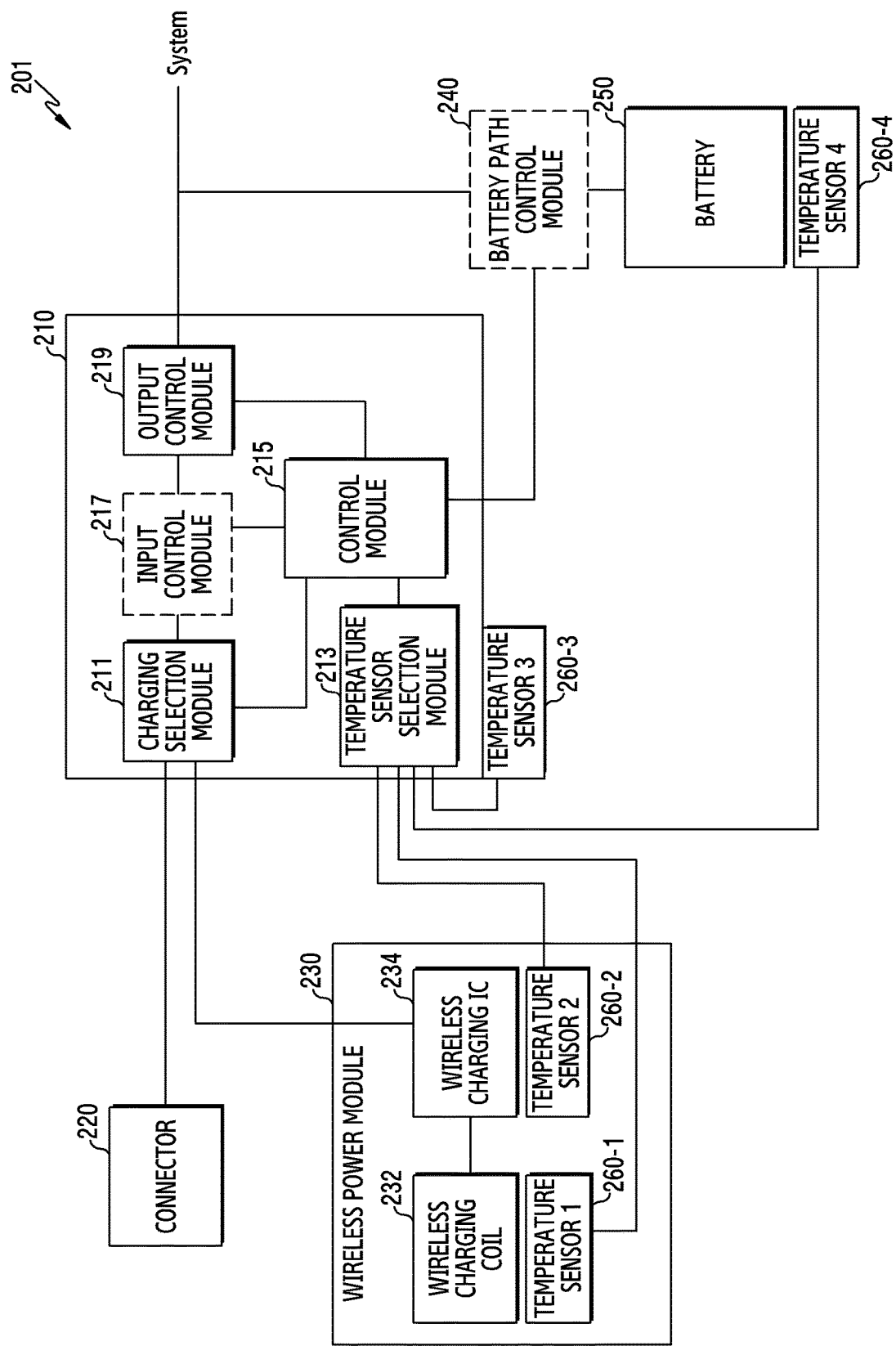
FIG. 2A through FIG. 2B illustrate a block diagram of a charging module in an electronic device according to various embodiments of the present invention.
Figure 2B:
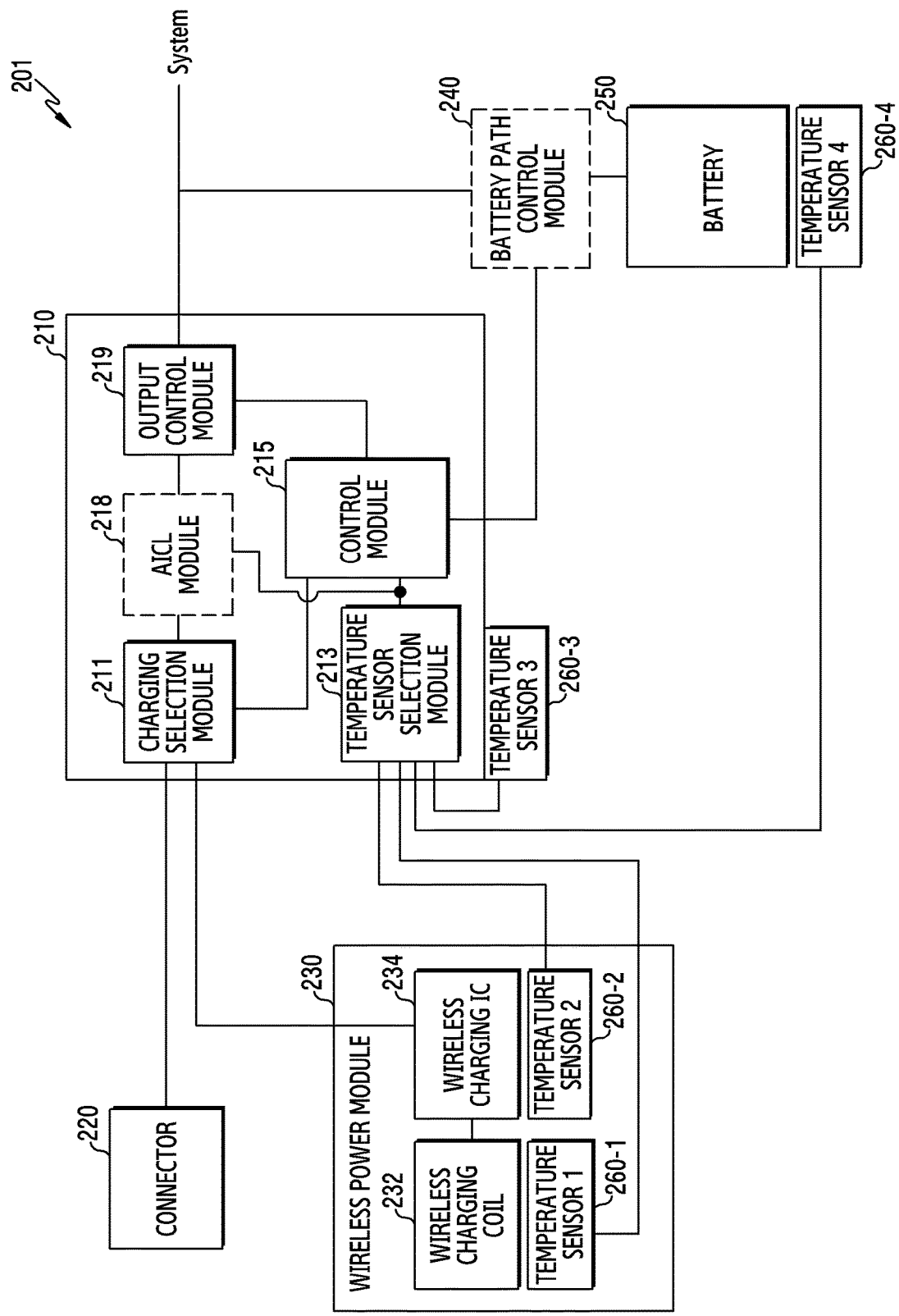

FIG. 2A through FIG. 2B illustrate a block diagram of a charging module in an electronic device according to various embodiments of the present invention. In the following descriptions, an electronic device 201 may include whole or part of the electronic device 101 of FIG. 1.

Referring to FIG. 2A, the electronic device 201 may include a charging module 210, a connector 220, a wireless power module 230, a battery path control module 240, a battery 250, and temperature sensors 260-1 through 260-4. For example, an input control module 217 and the battery path control module 240 which are indicated with dotted lines in FIG. 2 may be omitted.

According to an embodiment, the temperature sensors 260-1 through 260-4 (e.g., the temperature sensor 190 of FIG. 1) may measure a temperature of a corresponding position at different positions. For example, the first temperature sensor 260-1 may be disposed to physically contact a wireless charging coil 232 of the wireless power module 230, or to be adjacent to the wireless charging coil 232. The second temperature sensor 260-2 may be disposed to physically contact a wireless charging integrated circuit (IC) 234 of the wireless power module 230, or to be adjacent to the wireless charging IC 234. The third temperature sensor 260-3 may be disposed to physically contact the charging module 210, or to be adjacent to the charging module 210. The fourth temperature sensor 260-4 may be disposed to physically contact the battery 250, or to be adjacent to the battery 250.

According to an embodiment, the charging module 210 (e.g., the charging module 180 of FIG. 1) may include a charging selection module 211, a temperature sensor selection module 213, a control module 215, an input control module 217, and an output control module 219.

According to an embodiment, the charging selection module 211 may identify a charging type of the electronic device 201. For example, if an external power source is connected through the connector 220, the charging selection module 211 may determine that the electronic device 201 conducts the wired charging. Also, if an external power source is connected through the wireless power module 230, the charging selection module 211 may determine that the electronic device 201 conducts the wireless charging. For example, the charging type of the electronic device 201 may include at least one of the wired charging type, the wireless charging type, or a wired/wireless charging type.

According to an embodiment, the temperature sensor selection module 213 may select at least one temperature sensor (at least one of 260-1 through 260-4) required for the battery control based on the charging type of the electronic device 201. For example, if the electronic device 201 uses the wired charging type, the temperature sensor selection module 213 may select the third temperature sensor 260-3. Additionally or alternatively, if the electronic device 201 uses the wired charging type, the temperature sensor selection module 213 may additionally select the fourth temperature sensor 260-4. For example, if the electronic device 201 uses the wireless charging type or the wired/wireless charging type, the temperature sensor selection module 213 may select the plurality of the temperature sensors 260-1 through 260-4. For example, the temperature sensor selection module 213 may select at least one temperature sensor (at least one of 260-1 through 260-4) required for the battery control based on the charging type of the electronic device 201 which is provided from the charging selection module 211. For example, the temperature sensor selection module 213 may select at least one temperature sensor (at least one of 260-1 through 260-4) required for the battery control under control of the control module 215.

According to an embodiment, the control module 215 may determine a surface temperature of the electronic device 201 based on a temperature measured by at least one temperature sensor (at least one of 260-1 through 260-4) selected by the temperature sensor selection module 213. For example, the control module 215 may estimate the surface temperature of the electronic device 201 corresponding to the temperature measured by the temperature sensor (at least one of 260-1 through 260-4) using a mapping table stored in a memory (e.g., the memory 130 of FIG. 1) of the electronic device 201.

According to an embodiment, the control module 215 may control a charging current of the battery 250 based on the surface temperature of the electronic device 201. For example, if determining that the surface temperature of the electronic device 201 is higher than a reference temperature, the control module 215 may control the battery path control module 240 to block the charging current inputted to the battery 250. For example, if determining that the surface temperature of the electronic device 201 is higher than the reference temperature, the control module 215 may control the input control module 217 to decrease the input current of the charging module 210. For example, if determining that the surface temperature of the electronic device 201 is higher than the reference temperature, the control module 215 may control the output control module 219 to decrease an output current of the charging module 210. For example, if the temperature measured by at least one temperature sensor (at least one of 260-1 through 260-4) selected by the temperature sensor selection module 213 is higher than the control temperature of the corresponding temperature sensor, the control module 215 may determine that the surface temperature of the electronic device 201 is higher than the reference temperature.

According to an embodiment, if the temperature sensor selection module 213 selects the plurality of the temperature sensors 260-1 through 260-4, the control module 215 may periodically monitor the different temperature sensors 260-1 through 260-4. For example, if the temperature sensor selection module 213 selects the third temperature sensor 260-3 and the fourth temperature sensor 260-4, the control module 215 may monitor a temperature measured by the third temperature sensor 260-3 during a first period, and if a second period comes, measure a temperature measured by the fourth temperature sensor 260-4. For example, the monitoring period may be the same for the temperature sensors 260-1 through 260-4. For example, the monitoring period may differ according to a priority of the temperature sensor. The priority of the temperature sensor may be set based on the charging type of the electronic device 201.

According to an embodiment, the control module 215 may adaptively select the temperature sensors 260-1 through 260-4 which are a criterion for controlling the charging current of the battery 250. For example, if the temperature sensor selection module 213 selects the first temperature sensor 260-1 and the second temperature sensor 260-2, the control module 215 may monitor temperatures measured by the first temperature sensor 260-1 and the second temperature sensor 260-2. If the temperature measured by the first temperature sensor 260-1 is higher than a control temperature for the first temperature sensor 260-1, the control module 215 may control the charging current of the battery 250 based on the temperature measured by the first temperature sensor 260-1. If the temperature measured by the second temperature sensor 260-2 is higher than the temperature measured by the first temperature sensor 260-1 during the charging current control of the battery 250, the control module 215 may control the charging current of the battery 250 based on the temperature measured by the second temperature sensor 260-2.

According to an embodiment, the control module 215 may control the temperature sensor selection module 213 to select at least one temperature sensor (at least one of 260-1 through 260-4) corresponding to the charging type of the electronic device 201 provided from the charging selection module 211.

According to an embodiment, if the control module 215 regulates the charging current of the battery 250, the input control module 217 may decrease the input current of the charging module 210 to reduce the charging current of the battery 250. For example, the input control module 217 may include a first path which bypasses the charging selection module 211 and the output control module 219 and a second path which includes resistance between the charging selection module 211 and the output control module 219. If the control module 215 does not adjust the charging current of the battery 250, the input control module 217 may provide the external power to the output control module 219 through the first path. If the control module 215 adjusts the charging current of the battery 250, the input control module 217 may provide the external power to the output control module 219 through the second path, thus reducing the input current of the charging module 210. For example, the input control module 217 may include a variable resistor. Hence, the input control module 217 may regulate the input current of the charging module 210 by adjusting a resistance value of the variable resistor under control of the control module 215.

According to an embodiment, the output control module 219 may protect the battery 250 from overvoltage due to the external power. For example, the output control module 219 may lower and output a voltage of the external power provided from the connector 220 or the wireless power module 230 to a reference voltage. Additionally or alternatively, if the control module 215 regulates the charging current of the battery 250, the output control module 219 may decrease the output current of the charging module 210 to reduce the charging current of the battery 250. For example, the output control module 219 may include a buck boost switching module.

The connector 220, as a wired interface, may wiredly connect an external power device (e.g., an auxiliary battery device or a charging adaptor, etc.) to charge the battery 250.

The wireless power module 230, as a wireless interface, may wirelessly receive the external power using a wireless power reception method. For example, the wireless power module 230 may include the wireless charging coil 232 and the wireless charging IC 234 for wirelessly receiving the external power.

According to an embodiment, the wireless charging coil 232 may include a coil loop and a resonance circuit (a matching circuit) for wirelessly receiving the power.

According to an embodiment, the wireless charging IC 234 may convert alternating current (AC) power provided through the wireless charging coil 232 to direct current (DC) power suitable for the supply to the charging module 210. For example, the wireless charging IC 234 may include a rectifier module and a voltage regulator module. For example, the rectifier module may convert the AC power provided from the wireless charging coil 232 to the DC power suitable for the supply to the charging module 210. The voltage regulator module may convert the DC power provided from the rectifier module to the DC power suitable for the supply to the charging module 210.

According to an embodiment, the battery path control module 240 may control the charging path between the charging module 210 and the battery 250. For example, if the control module 215 does not regulate the charging current of the battery 250, the battery path control module 240 may set the charging path between the charging module 210 and the battery 250 and thus supply the output current of the charging module 210 to the battery 250. For example, if the control module 215 regulates the charging current of the battery 250, the battery path control module 240 may block the output current of the charging module 210 from being supplied to the battery 250 by releasing the charging path between the charging module 210 and the battery 250.

According to an embodiment, the wireless power module 230 may wirelessly transmit the power of the battery 250 to the external power source using a wireless power transmission method.

The battery 250 may include at least one cell, and may be charged with the external power and supply the power to the components of the electronic device 101.

Referring to FIG. 2B, the electronic device 201 may include the charging module 210, the connector 220, the wireless power module 230, the battery path control module 240, the battery 250, and the temperature sensors 260-1 through 260-4. In the following descriptions, the connector 220, the wireless power module 230, the battery path control module 240, the battery 250, and the temperature sensors 260-1 through 260-4 of FIG. 2B operate the same as the respective components of the electronic device 201 of FIG. 2A, and thus their detailed explanations are omitted.

According to an embodiment, the charging module 210 (e.g., the charging module 180 of FIG. 1) may include the charging selection module 211, the temperature sensor selection module 213, the control module 215, an adaptive input current limit (AICL) module 218, and the output control module 219. In the following descriptions, the charging selection module 211, the temperature sensor selection module 213, the control module 215, and the output control module 219 of the charging module 210 operate the same as the respective components of the charging module 210 of FIG. 2A, and thus their detailed explanations are omitted.

According to an embodiment, the AICL module 218 may regulate the input current of the charging module 210 based on the voltage inputted to the charging module 210. For example, if the input voltage of the charging module 210 reduces and falls below an under voltage lockout (UVLO) value, the charging module 210 may block the charging of the battery 250. Hence, if the input voltage of the charging module 210 falls below a reference voltage, the AICL module 218 may lower the input current of the charging module 210 so that the input voltage of the charging module 210 does not fall below the reference voltage. For example, the reference voltage may be set to be higher than the UVLO value. For example, the input voltage of the charging module 210 may decrease as load of an internal module of the electronic device 201 which receives the current through the charging module 210 increases and the input current of the charging module 210 increases. For example, the input voltage of the charging module 210 may decrease due to a poor path between the connector 220 and the charging module 210.

According to an embodiment, the AICL module 218 may reduce the input current of the charging module 210 based on the surface temperature of the electronic device 201. For example, the AICL module 218 may determine the surface temperature of the electronic device 201 based on the temperature measured by at least one temperature sensor (at least one of 260-1 through 260-4) selected by the temperature sensor selection module 213. If the surface temperature of the electronic device 201 is higher than the reference temperature, the AICL module 218 may regulate the input current of the charging module 210 to control the charging current of the battery 250. In this case, the temperature sensor selection module 213 may select at least one temperature sensor (at least one of 260-1 through 260-4) based on the control of the control module 215.

Figure 3:
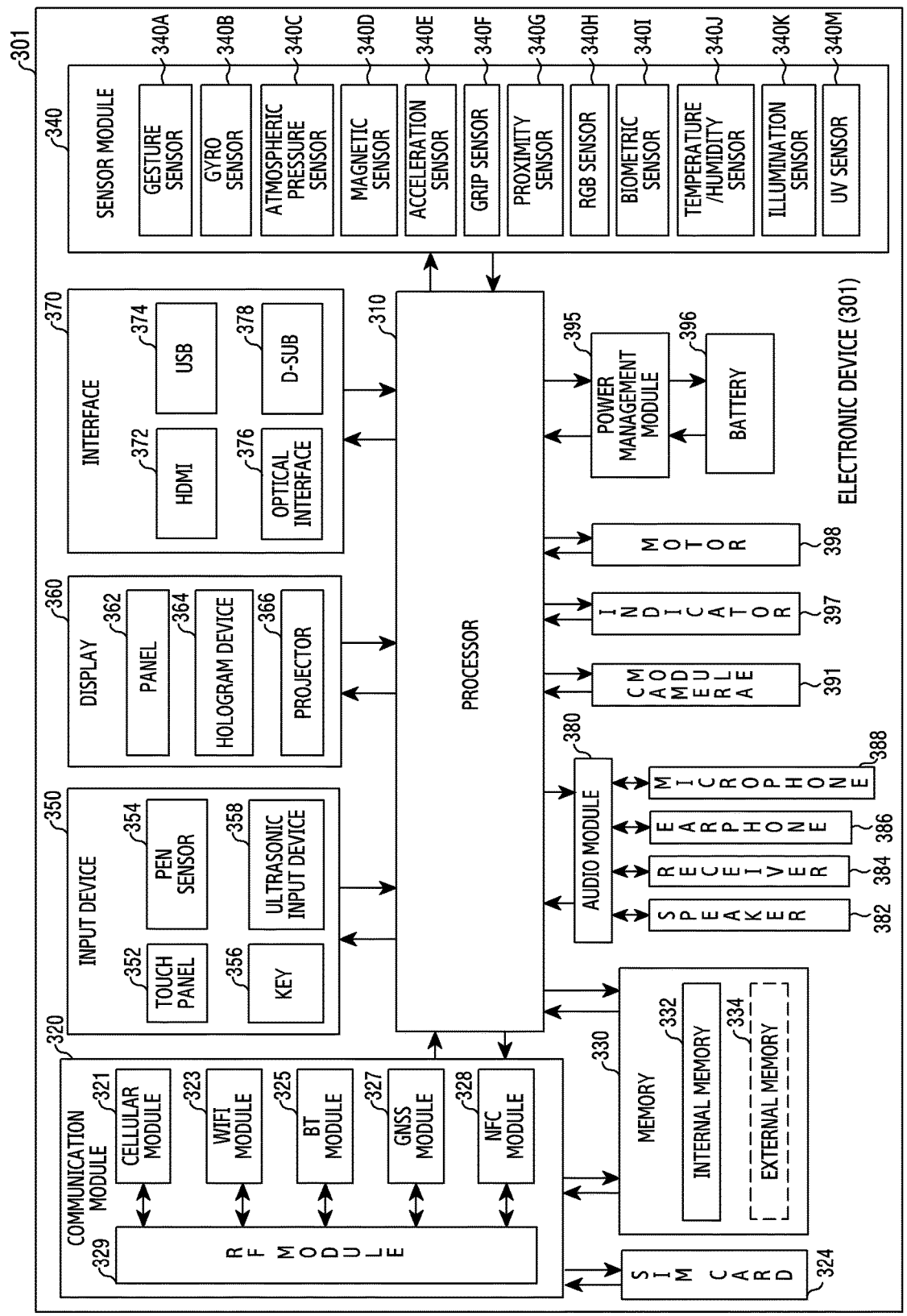
FIG. 3 illustrates a block diagram of an electronic device according to various embodiments of the present invention.

FIG. 3 illustrates a block diagram of an electronic device 301 according to various embodiments of the present invention. The electronic device 301, for example, may include whole or part of the electronic device 101 of FIG. 1. The electronic device 301 may include one or more processors (e.g., an AP) 310, a communication module 320, a subscriber identification module 324, a memory 330, a sensor module 340, an input device 350, a display 360, an interface 370, an audio module 380, a camera module 391, a power management module 395, a battery 396, an indicator 397, and a motor 398.

The processor 310 may control a plurality of hardware or software elements connected thereto and may perform various data processing and operations by driving an operating system or an application program. The processor 310 may be implemented as, for example, a System on Chip (SoC). According to an embodiment, the processor 310 may further include a graphic processing unit (GPU) and/or an image signal processor (ISP). The processor 310 may also include at least some of the elements illustrated in FIG. 3 (e.g., a cellular module 321). The processor 310 may load, in a volatile memory, commands or data received from at least one of the other elements (e.g., a non-volatile memory), process the loaded commands or data, and store the result data in the non-volatile memory.

The communication module 320 may have a configuration the same as or similar to that of the communication interface 270 in FIG. 2. The communication module 320 may include, for example, a cellular module 321, a Wi-Fi module 323, light fidelity (LiFi) module 324, a Bluetooth module 325, a global navigation satellite system (GNSS) module 327 (for example, a global positioning system (GPS) module, a Glonass module, a Beidou module, or a Galileo module), a near field communication (NFC) module 328, and a radio frequency (RF) module 329.

The cellular module 321 may provide, for example, a voice call, a video call, a text message service, an Internet service, etc. through a communication network. According to an embodiment, the cellular module 321 may identify and authenticate the electronic device 301 within a communication network using the subscriber identification module 336 (for example, a SIM card). According to an embodiment, the cellular module 221 may perform at least some of the functions that the processor 310 may provide. According to an embodiment, the cellular module 321 may include a communication processor (CP).

According to some embodiments, at least some (two or more) of the cellular module 321, the Wi-Fi module 323, the LiFi module 324 the Bluetooth module 325, the GNSS module 327, and the NFC module 328 may be included in one Integrated Chip (IC) or IC package.

The RF module 329 may transmit and receive, for example, a communication signal (for example, an RF signal). The RF module 329 may include, for example, a transceiver, a power amplifier (amp) module (PAM), a frequency filter, a low noise amplifier (LNA), an antenna, or the like. According to another exemplary embodiment, at least one of the cellular module 321, the Wi-Fi module 323, the Bluetooth module 325, the GNSS module 327, and the NFC module 328 may transmit and receive an RF signal through a separate RF module. The SIM 336 may include, for example, a card including an SIM and/or an embedded SIM and may include unique identification information (for example, an integrated circuit card identifier (ICCID)) or subscriber information (for example, an international mobile subscriber identity (IMSI)).

The memory 330 (for example, a memory 230) may include, for example, an internal memory 332 or an external memory 334. The internal memory 332 may include, for example, at least one of a volatile memory (for example, a dynamic random-access memory (DRAM), a static RAM (SRAM), a synchronous dynamic RAM (SDRAM), or the like) and a nonvolatile memory (for example, a one-time programmable read-only memory (OTPROM), a programmable ROM (PROM), an erasable and programmable ROM (EPROM), an electrically erasable and a programmable ROM (EEPROM), a mask ROM, a flash ROM, a flash memory (for example, an NAND flash, an NOR flash, or the like), a hard drive, or a solid state drive (SSD)). The external memory 334 may further include a flash drive, for example, a compact flash (CF), a secure digital (SD), a micro secure digital (micro-SD), a mini secure digital (mini-SD), an extreme digital (xD), a multi-media card (MMC), a memory stick, or the like. The external memory 334 may be functionally and/or physically connected to the electronic device 301 through various interfaces.

The sensor module 340 may measure, for example, physical quantities or detect an operation state of the electronic device 301 and convert measured or detected information into an electrical signal. The sensor module 340 may include, for example, at least one of a gesture sensor 340A, a gyro sensor 340B, a barometric pressure sensor 340C (atmospheric pressure sensor), a magnetic sensor 340D, an accelerometer 340E, a grip sensor 340F, a proximity sensor 340G, a color sensor 340H (for example, a red, green, and blue (RGB) sensor), a biometric sensor 340I, a temperature/humidity sensor 340J, a illumination sensor 340K, a ultraviolet (UV) sensor 340M, and a galvanic skin reflex (GRS) sensor 340N. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, a force touch sensor, an ultrasonic sensor, and/or a fingerprint sensor. The sensor module 340 may further include a control circuit to control at least one or more sensors belonging thereto. In one exemplary embodiment, the electronic device 301 may further include a processor configured, as a part of the processors 310 or separately from the processors 310, to control the sensor module 340, thereby controlling the sensor module 340 while the processors 310 is in a sleep state.

The input device 350 may include, for example, a touch panel 352, a (digital) pen sensor 354, a key 356, or an ultrasonic input device 358. The touch panel 352 may use, for example, at least one of an electrostatic type, a pressure-sensitive type, an infrared type, and an ultrasonic type. Further, the touch panel 352 may further include a control circuit. The touch panel 352 may further include a tactile layer to provide a user with a tactile response. The (digital) pen sensor 354 may, for example, be part of the touch panel or include a separate recognition sheet. The key 356 may include, for example, a physical button, an optical key, or a keypad. The ultrasonic device 358 may detect ultrasonic waves generated in an input tool through a microphone (for example, a microphone 388) and identify data corresponding to the detected ultrasonic waves.

The display 360 (e.g., the display 260) can include a panel 362, a hologram device 364, a projector 366, and/or a control circuit for controlling them. The panel 362 can, for example, be implemented to be flexible, transparent, or wearable. The panel 362 can be constructed as one or more modules together with the touch panel 352. According to one exemplary embodiment, the panel 362 can include a pressure sensor (or force sensor) capable of measuring pressure information (e.g., a pressure coordinate and a pressure strength) about a user's touch. The pressure sensor can be implemented in an integrated type with the touch panel 352, or be implemented as one or more sensors separate from the touch panel 352. The hologram device 364 can use the interference of light to show a three-dimensional image to the air. The projector 366 can project light onto a screen to display an image. The screen can, for example, be located inside or outside the electronic device 301. The interface 370 can, for example, include an HDMI 372, a USB 374, an optical interface 376, or a D-subminiature (D-sub) 378. The interface 270 can, for example, be included in the communication interface 270 illustrated in FIG. 2. Additionally or alternatively, the interface 370 can, for example, include a Mobile High-definition Link (MHL) interface, an SD card/Multi Media Card (MMC) interface, or an Infrared Data Association (IrDA) standard interface.

The audio module 380 may convert, for example, a sound and an electrical signal reciprocally. At least some components of the audio module 280 may be included, for example, in an input/output interface 250 illustrated in FIG. 2. The audio module 380 may process sound information input or output, for example, through a speaker 382, a receiver 384, earphones 386, or the microphone 388.

The camera module 391 is a device that takes, for example, a still image and a video. According to one exemplary embodiment, the camera module 391 may include one or more image sensors (for example, a front sensor or a rear sensor), a lens, an image signal processor (ISP), or a flash (for example, an LED, a xenon lamp, or the like).

The power management module 395 may manage, for example, the power of the electronic device 301. According to one exemplary embodiment, the power management module 395 may include a power management integrated circuit (PMIC), a charger integrated circuit (IC), or a battery or fuel gauge. The power management module 395 may be supplied with power from the outside via a cable and/or wirelessly. For example, the power management module 395 may be supplied with power from the outside using a wireless charging method, such as a magnetic resonance method, a magnetic induction method, or an electromagnetic wave method. The power management module 395 may further include an additional circuit, such as a coil loop, a resonance circuit, or a rectifier, to be supplied with power wirelessly. The battery gauge may measure, for example, the remaining battery charge, the charging voltage, the current, or temperature of the battery 396. The battery 396 may include, for example, a rechargeable battery and/or a solar battery.

According to an embodiment, the power management module 395 (e.g., the charging module 180 of FIG. 1) may regulate a battery charging current based on a temperature detected through the temperature/humidity sensor 340J. The power management module 395 may lower the battery charging current if the temperature detected through the temperature/humidity sensor 340J is higher than a control temperature of the corresponding temperature/humidity sensor 340J.

The indicator 397 may display a specific state of the electronic device 301 or a component thereof (for example, the processors 310), for example, a booting state, a message state, or a charging state. The motor 398 may convert an electrical signal into mechanical vibrations and may generate vibrations or a haptic effect. Although not shown, the electronic device 301 may include a processing device for supporting a mobile TV (for example, a GPU). The processing device for supporting the mobile TV may process media data in accordance with digital multimedia broadcasting (DMB), digital video broadcasting (DVB), or mediaFlo™ standards. Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 4:
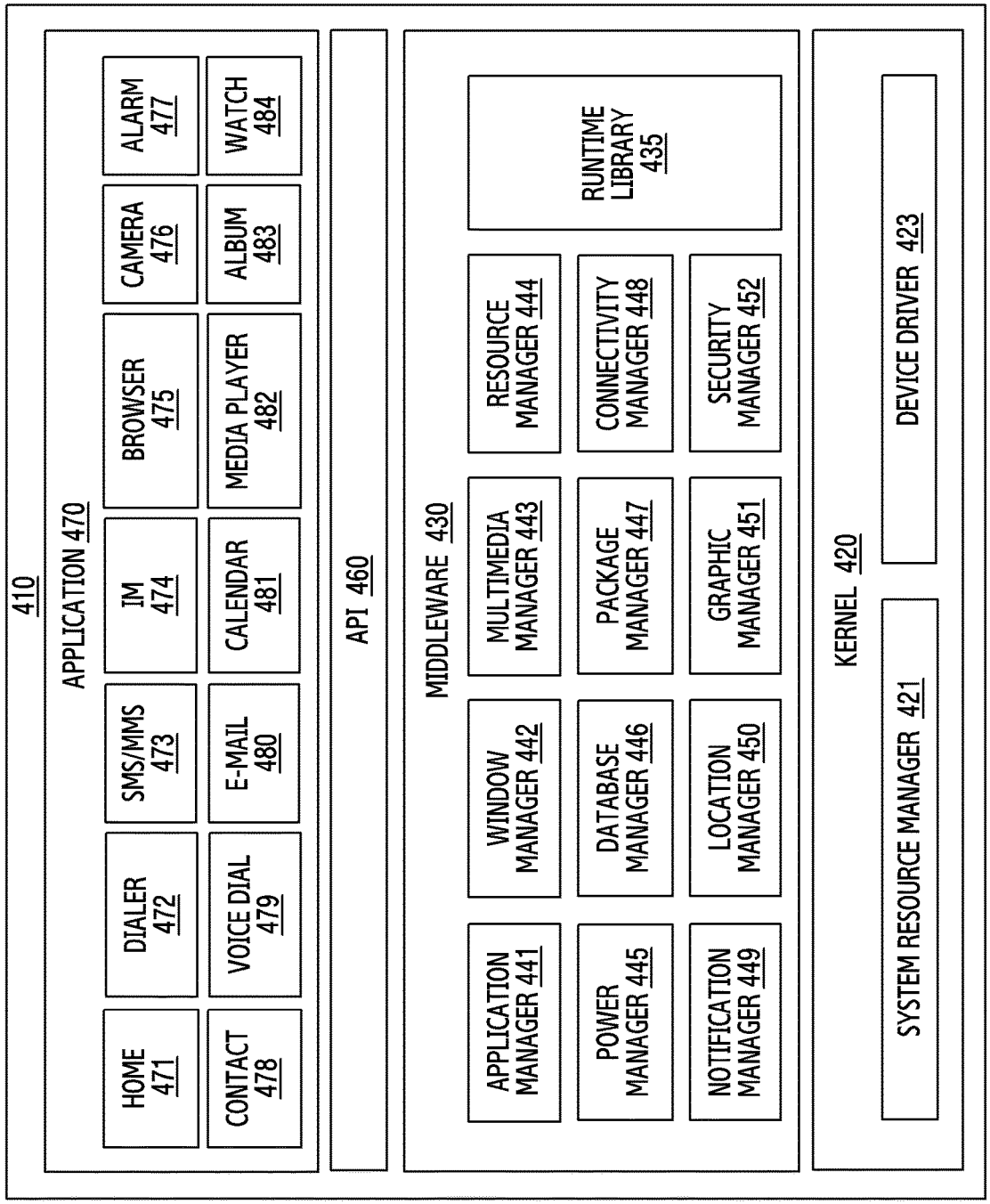
FIG. 4 illustrates a block diagram of a program module according to various embodiments of the present invention.

FIG. 4 illustrates a block diagram of a program module according to various embodiments. According to an embodiment, a program module 410 (e.g., the program 140 of FIG. 1) may include an OS for controlling a resource relating to an electronic device (e.g., the electronic device 101 of FIG. 1) and/or various applications (e.g., the application program 147 of FIG. 1) running on the OS. The OS may include, for example, Android™, iOS™, Windows™, Symbian™, Tizen™, or Bada™.

Referring to FIG. 4, the program module 310 may include a kernel 420 (e.g., the kernel 141 of FIG. 1), a middleware 430 (e.g., the middleware 143 of FIG. 1), an API 460 (e.g., the API 145 of FIG. 1), and/or an application 470 (e.g., the application program 147). At least part of the program module 410 may be preloaded on the electronic device or downloaded from an external electronic device (e.g., the electronic device 102 and 104, the server 106 of FIG. 1).

The kernel 420 may include, for example, a system resource manager 421 and/or a device driver 423. The system resource manager 421 may control, allocate, or retrieve a system resource. According to an embodiment, the system resource manager 421 may include a process management unit, a memory management unit, or a file system management unit. The device driver 423 may include, for example, a display driver, a camera driver, a Bluetooth driver, a sharing memory driver, a USB driver, a keypad driver, a WiFi driver, an audio driver, or an inter-process communication (IPC) driver. The middleware 430, for example, may provide a function commonly required by the application 470, or provide various functions to the application 470 through the API 460 so that the application 470 may efficiently use limited system resources inside the electronic device. According to an embodiment, the middleware 430 may include at least one of a runtime library 435, an application manager 441, a window manager 442, a multimedia manager 443, a resource manager 444, a power manager 445, a database manager 446, a package manager 447, a connectivity manager 448, a notification manager 449, a location manager 450, a graphic manager 451, or a security manager 452.

The runtime library 435 may include, for example, a library module used by a complier to add a new function through a programming language while the application 470 is running. The runtime library 435 may manage input/output, manage memory, or arithmetic function. The application manager 441, for example, may manage a life cycle of the application 470. The window manager 442 may manage a graphical user interface (GUI) resource used in a screen. The multimedia manager 443 may recognize a format for playing media files, and encode or decode a media file by using a codec of a corresponding format. The resource manager 444 may manage a source code of the application 470 or a memory space. The power manager 445 may manage, for example, capacity or power of the battery, and provide necessary power information for the operations of the electronic device. According to an embodiment, the power manager 445 may operate with a basic input/output system (BIOS). The database manager 446 may, for example, create, search, or modify a database to be used by the application 470. The package manager 447 may manage installation or updating of an application distributed in a package file format.

The connectivity manger 448 may manage, for example, a wireless connection. The notification manager 449 may provide, for example, an event such as an incoming message, an appointment, and a proximity alert, to the user. The location manager 450 may manage, for example, location information of the electronic device. The graphic manager 451 may manage, for example, a graphic effect to be provided to the user or a user interface relating thereto. The security manager 452 may provide, for example, system security or user authentication. According to an embodiment, the middleware 430 may include a telephony manager for managing a voice or video call function of the electronic device, or a middleware module for combining the functions of the above-described components. According to an embodiment, the middleware 430 may provide a module specialized for each type of the OS. The middleware 430 may dynamically delete some of the existing components or add new components. The API 460, as a set of API programming functions, may be provided as a different configuration according to the OS. For example, Android or iSO may provide one API set for each platform, and Tizen may provide two or more API sets for each platform.

The application 470 may include, for example, a home 471, a dialer 472, a short message service (SMS)/multimedia message service (MMS) 473, an instant message (IM) 474, a browser 475, a camera 476, an alarm 477, a contact 478, a voice dial 479, an e-mail 480, a calendar 481, a media player 482, an album 483, a watch 484, health care (e.g., measure an exercise amount or blood sugar level), or an environmental information (e.g., atmospheric pressure, humidity, or temperature information) provision application. According to an embodiment, the application 470 may include an information exchange application for supporting information exchange between the electronic device and an external electronic device. The information exchange application may include, for example, a notification relay application for relaying specific information to the external electronic device, or a device management application for managing the external electronic device. For example, the notification relay application may forward notification information generated from another application of the electronic device to the external electronic device, or receive and forward notification information from the external electronic device to the user. The device management application may, for example, install, delete, or update a function (e.g., turn-on/turn off of the external electronic device itself (or some components) or display brightness (or resolution) adjustment) of the external electronic device which communicates with the electronic device, or an application operating in the external electronic device. According to an embodiment, the application 470 may include a designated application (e.g., a health care application of a mobile medical device) according to a property of the external electronic device. According to an embodiment, the application 470 may include an application received from the external electronic device. At least part of the program module 410 may be implemented (e.g., executed) with software, firmware, hardware (e.g., the processor 310 of FIG. 3), or a combination of at least two of them, and may include a module, a program, a routine, an instruction set, or a process for executing one or more functions.

According to various embodiments of the present invention, an electronic device may include a plurality of temperature sensors disposed at different positions, a battery, a memory, at least one processor, and a charging module for controlling charging of the battery, wherein the charging module may be configured to identify a charging type of the battery, to select at least one temperature sensor among the plurality of the temperature sensors based on the charging type of the battery, and to control a charging current of the battery based on a temperature measured through the at least one temperature sensor.

According to various embodiments, the charging module may be configured to determine the charging type of the battery based on an interface connected to an external power device, and the interface may include at least one of a wired interface for wired connection or a wireless interface for wireless connection.

According to various embodiments, if charging the battery based on a wired charging type, the charging module may be configured to select at least one temperature sensor associated with the charging module.

According to various embodiments, if charging the battery based on a wireless charging type, the charging module may be configured to select at least one temperature sensor associated with a wireless power module and the charging module.

According to various embodiments, if selecting at least two temperature sensors based on the battery charging type, the charging module may be configured to set a monitoring period of each of the at least two temperature sensors, and to monitor a temperature measured through a temperature sensor corresponding to each monitoring period.

According to various embodiments, the monitoring period may be different for each of the at least two temperature sensor based on the battery charging type.

According to various embodiments, if measuring a temperature higher than a control temperature through the at least one temperature sensor, the charging module may be configured to reduce the battery charging current.

According to various embodiments, if measuring a temperature higher than a control temperature through the at least one temperature sensor, the charging module may be configured to reduce an input current of the charging module.

According to various embodiments, if measuring a temperature higher than a control temperature through the at least one temperature sensor, the charging module may be configured to reduce an output current of the charging module.

According to various embodiments, if measuring a temperature higher than a control temperature through the at least one temperature sensor, the charging module may be configured to block the battery charging current.

Figure 5:
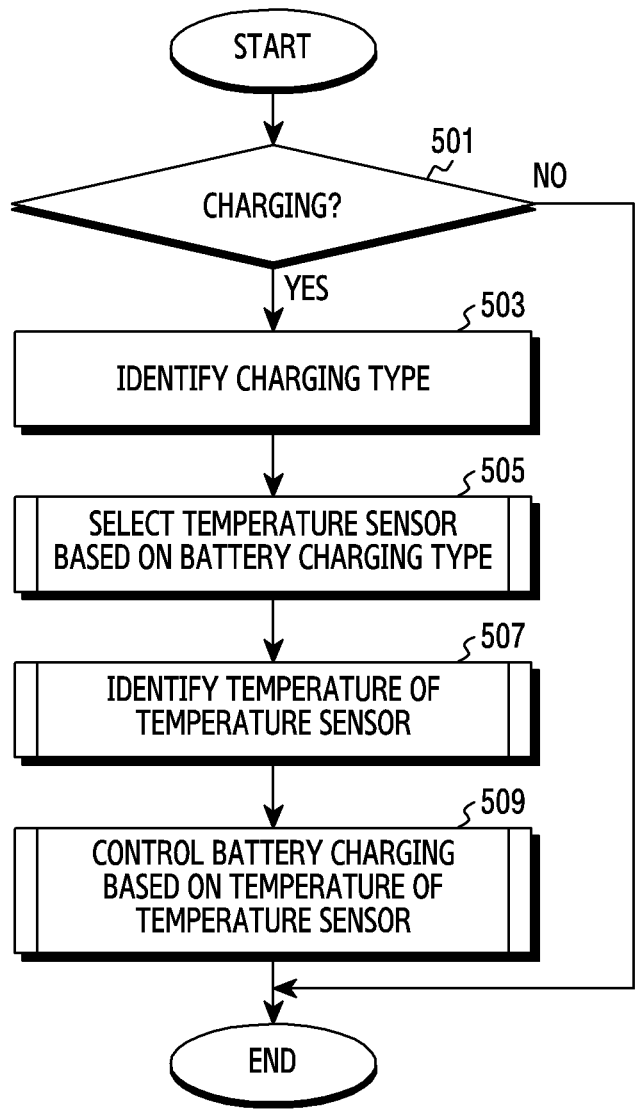
FIG. 5 illustrates a flowchart for controlling battery charging in a charging module according to various embodiments of the present invention.

FIG. 5 illustrates a flowchart for controlling battery charging in a charging module according to various embodiments of the present invention. In the following descriptions, an electronic device may include the charging module 180 of FIG. 1 or the charging module 210 of FIG. 2.

Referring to FIG. 5, the electronic device may, in operation 501, identify whether a battery of the electronic device is charged. For example, the charging module 210 may identify whether an external power device (e.g., a charging adaptor) for charging the battery 250 is connected to the connector 220. For example, if the external power device is connected to the connector 220, the charging module 210 may determine that the battery charging is conducted. For example, the charging module 210 may identify whether there exists an external power device (e.g., a wireless charging pad) which is wirelessly connected through the wireless power module 230 to charge the battery 250. For example, if there exists the external power device wirelessly connected through the wireless power module 230, the charging module 210 may determine that the battery charging is conducted.

In operation 503, if charging the battery of the electronic device, the electronic device may identify a battery charging type. For example, the charging selection module 211 of the charging module 210 may determine the battery charging type based on an interface (e.g., the connector 220 or the wireless power module 230) connected to the external power device. For example, if the external power device is connected through the connector 220, the charging selection module 211 may determine that the battery of the electronic device 201 is charged using the wired charging type. If the external power device is connected through the wireless power module 230, the charging selection module 211 may determine that the battery of the electronic device 201 is charged using the wireless charging type.

In operation 505, the electronic device may select a temperature sensor for monitoring to control a charging current of the battery based on the battery charging type of the electronic device. For example, if using the wired charging type, the temperature sensor selection module 213 of the charging module 210 may select the third temperature sensor 260-3. The temperature sensor selection module 213 may additionally select the fourth temperature 260-4. For example, if using the wireless charging type, the temperature sensor selection module 213 of the charging module 210 may select at least one of the first temperature sensor 260-1 or the second temperature sensor 260-2. The temperature sensor selection module 213 may additionally select at least one of the third temperature sensor 260-3 or the fourth temperature sensor 260-4.

In operation 507, the electronic device may identify a temperature (e.g., an internal temperature of the electronic device) measured by the temperature sensor corresponding to the battery charging type of the electronic device. For example, if selecting a plurality of temperature sensors in operation 505, the control module 215 of the charging module 210 may monitor temperatures measured by the temperature sensors at the same time. For example, if selecting a plurality of temperature sensors in operation 505, the control module 215 of the charging module 210 may monitor temperatures measured by different temperature sensors at each monitoring period. For example, the monitoring period may be set the same for each temperature sensor, or may differ according to a priority of the temperature sensor.

In operation 509, the electronic device may control the battery charging based on the temperature measured by the temperature sensor. For example, if the temperature measured by the temperature sensor (e.g., the third temperature sensor 260-3) is higher than a control temperature of the corresponding temperature sensor, the control module 215 of the charging module 210 may lower a charging current of the battery 250. For example, the control module 215 may reduce an input current of the charging module 210 through the input control module 217, reduce an output current of the charging module 210 through the output control module 219, and or block a charging current inputted to the battery 250 through the battery path control module 240. That is, the control module 215 may control to reduce an amount of the charging current supplied to the battery 250.

Figure 6:
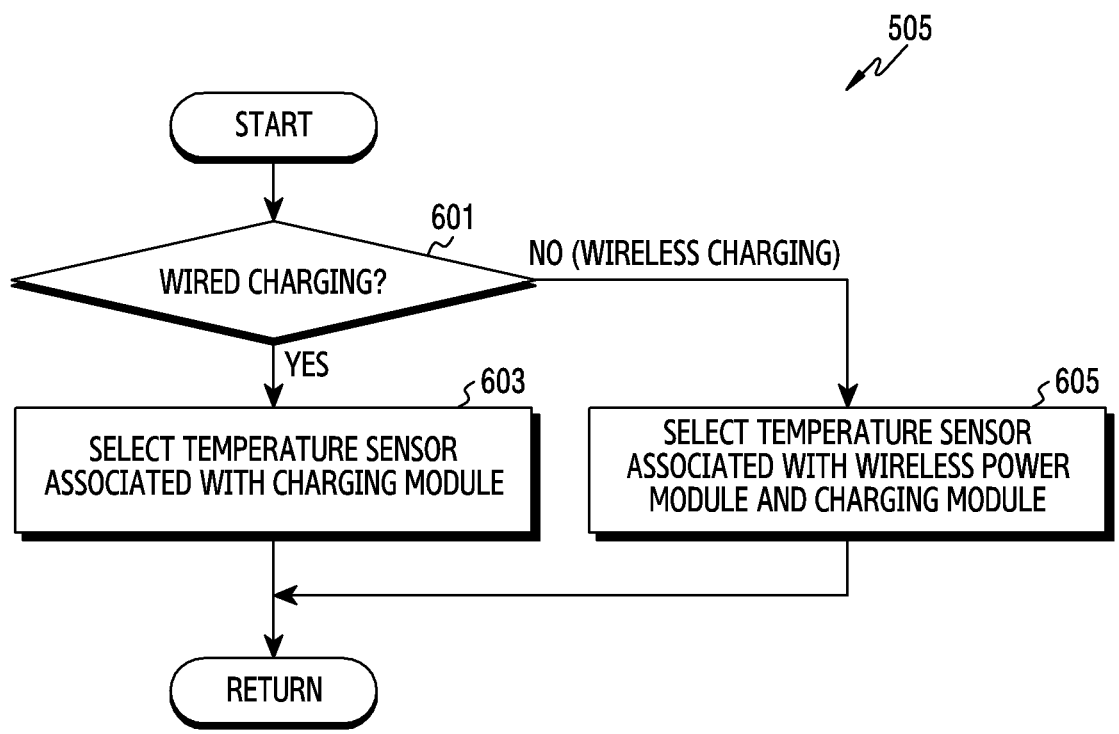
FIG. 6 illustrates a flowchart for selecting a temperature sensor in a charging module according to various embodiments of the present invention.

FIG. 6 illustrates a flowchart for selecting a temperature sensor in a charging module according to various embodiments of the present invention. The following describes operations for selecting the temperature sensor corresponding to the charging type in operation 505 of FIG. 5. In the following descriptions, an electronic device may include the charging module 180 of FIG. 1 or the charging module 210 of FIG. 2.

Referring to FIG. 6, if identifying the charging type of the electronic device (e.g., operation 503 of FIG. 5), the electronic device may identify whether the battery is charged with the wired charging type in operation 601. For example, the charging module 210 may identify whether the battery 250 is charged using external power supplied from an external power device connected through the connector 220.

In operation 603, if charging the battery with the wired charging type, the electronic device may select at least one temperature sensor associated with the charging module which may generate heat in the wired charging, as a temperature sensor to monitor. For example, the charging module 210 may select the third temperature sensor 260-3 associated with the charging module 210 which may generate heat in the wired charging, and the fourth temperature sensor 260-4 associated with the battery 250.

In operation 605, if charging the battery with the wireless charging type, the electronic device may select at least one temperature sensor associated with the wireless power module and the charging module which may generate heat in the wireless charging, as a temperature sensor to monitor. For example, the charging module 210 may select the first temperature sensor 260-1 associated with the wireless charging coil 232 which may generate heat in the wireless charging and the second temperature sensor 260-4 associated with the wireless charging IC 234. The charging module 210 may additionally select the third temperature sensor 260-3 associated with the charging module 210 which may generate heat in the battery charging and the fourth temperature sensor 260-4 associated with the battery 250.

Figure 7:
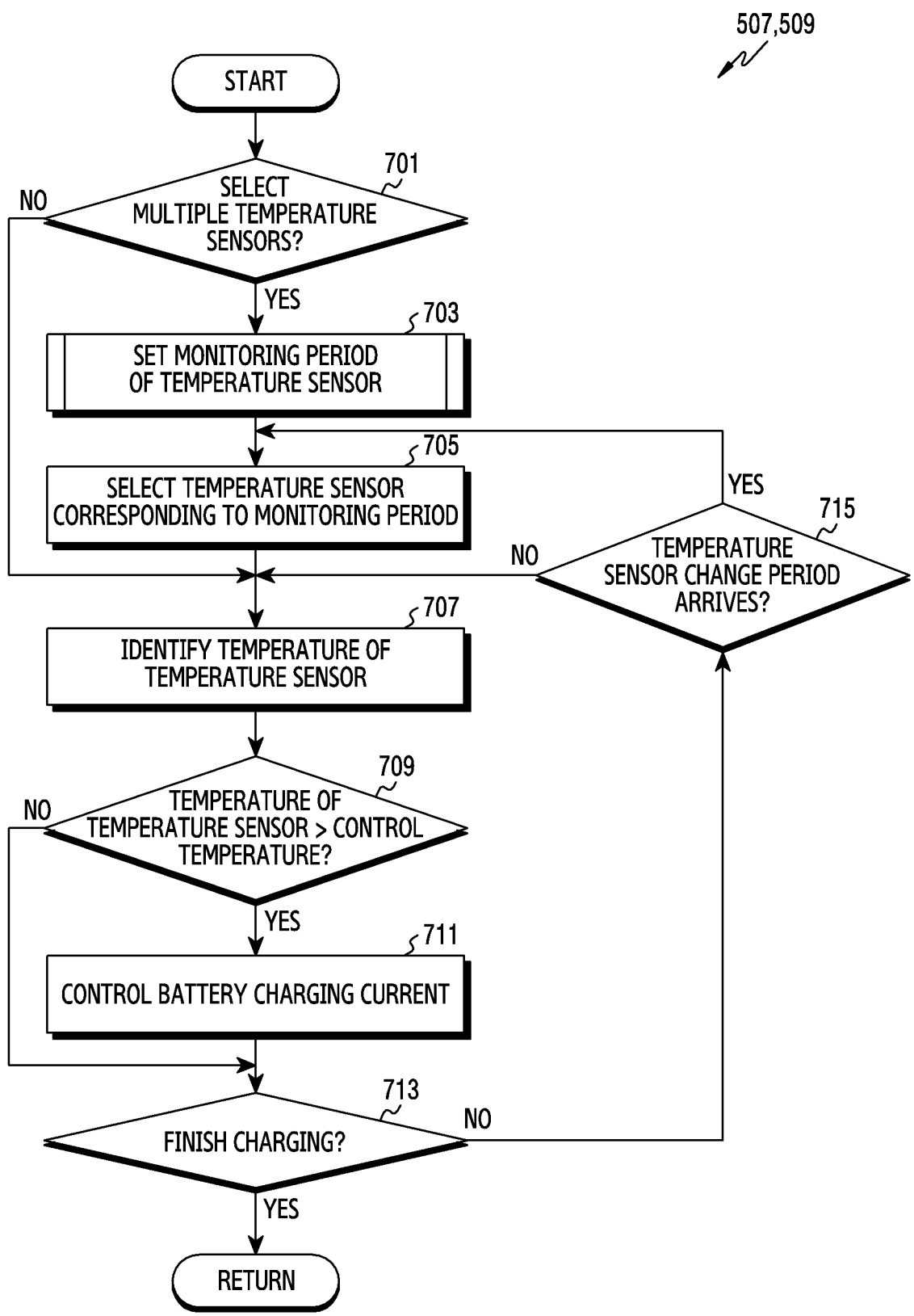
FIG. 7 illustrates a flowchart for monitoring a temperature sensor based on a monitoring period in a charging module according to various embodiments of the present invention.

FIG. 7 illustrates a flowchart for monitoring a temperature sensor based on a monitoring period in a charging module according to various embodiments of the present invention. The following describes operations for controlling battery charging based on the temperature sensor corresponding to the charging type in operations 507 through 509 of FIG. 5. Hereafter, an electronic device may include the charging module 180 of FIG. 1 or the charging module 210 of FIG. 2.

Referring to FIG. 7, in operation 701, if selecting a temperature sensor for monitoring to control the battery charging (e.g., operation 505 of FIG. 5), the electronic device may identify whether a plurality of temperature sensors is selected for the monitoring.

If selecting one temperature sensor for monitoring to control the battery charging, the electronic device may identify a temperature measured by the selected temperature sensor in operation 707. For example, the charging module 210 (e.g., the control module 215) may monitor the temperature measured by the third temperature sensor 260-3, in the wired charging.

In operation 703, if selecting a plurality of temperature sensors for monitoring to control the battery charging, the electronic device may set a monitoring period for each temperature sensor. For example, the charging module 210 (e.g., the control module 215) may set the monitoring period for each temperature sensor to periodically monitor different temperature sensors. For example, the period for monitoring the temperature sensors may be the same or different based on priorities of the temperature sensors.

In operation 705, the electronic device may select a temperature sensor corresponding to the monitoring period. For example, the charging module 210 (e.g., the temperature sensor selection module 213) may select the first temperature sensor 260-1 associated with the wireless charging coil 232, if a first monitoring period arrives in the wireless charging.

In operation 707, the electronic device may identify a temperature measured by the temperature sensor corresponding to the monitoring period. For example, in the wireless charging, the charging module 210 (e.g., the control module 215) may monitor the temperature measured by the first temperature sensor 260-1 during the first monitoring period.

In operation 709, the electronic device may identify whether the temperature measured by the temperature sensor is higher than a control temperature of the corresponding temperature sensor. For example, if selecting the first temperature sensor 260-1 in operation 705, the charging module 210 (e.g., the control module 215) may identify a control temperature matched to the first temperature sensor 260-1. The charging module 210 may identify whether a higher temperature than the control temperature is measured by the first temperature sensor 260-1 in the first monitoring period.

If the temperature measured by the temperature sensor is not higher than the control temperature of the corresponding temperature sensor, the electronic device may identify whether the battery charging for the electronic device is finished in operation 713. For example, the charging module 210 (e.g., the control module 215) may identify whether a connection with an external power device connected through the connector 220 or the wireless power module 230 is released.

In operation 711, if the temperature measured by the temperature sensor is higher than the control temperature of the corresponding temperature sensor, the electronic device may control a battery charging current to reduce heat of the electronic device. For example, the charging module 210 (e.g., the input control module 217) may decrease a current inputted to the charging module 210 to regulate the charging current of the battery 250. For example, the charging module 210 (e.g., the output control module 219) may decrease a current outputted from the charging module 210 to regulate the charging current of the battery 250. For example, the charging module 210 (e.g., the battery path control module 240) may interrupt the charging current of the battery 250 to regulate the charging current of the battery 250. For example, the charging module 210 may control the battery charging current and keep monitoring the temperature sensor.

In operation 713, the electronic device may identify whether the battery charging for the electronic device is finished.

In operation 715, if the battery charging for the electronic device is not finished, the electronic device may identify whether a temperature sensor change period arrives. For example, the charging module 210 (e.g., the temperature sensor selection module 213) may identify whether a second monitoring period arrives while monitoring the first temperature sensor 260-1 in the first monitoring period.

If the temperature sensor change period does not arrive, the electronic device may keep monitoring a corresponding temperature sensor in operation 707.

If the temperature sensor change period arrives, the electronic device may select a temperature sensor corresponding to the changed monitoring period in operation 705. For example, if the second monitoring period arrives, the charging module 210 (e.g., the control module 215) may select the second temperature sensor 260-2 as the temperature sensor for the monitoring.

Figure 8:
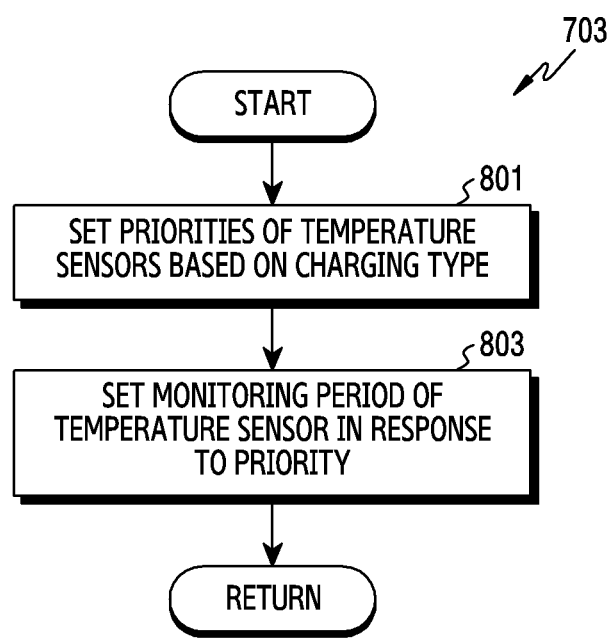
FIG. 8 illustrates a flowchart for setting a monitoring period of a temperature sensor in a charging module according to various embodiments of the present invention.

FIG. 8 illustrates a flowchart for setting a monitoring period of a temperature sensor in a charging module according to various embodiments of the present invention. The following describes operations for setting the monitoring period of the temperature sensor in operation 703 of FIG. 7. Hereafter, an electronic device may include the charging module 180 of FIG. 1 or the charging module 210 of FIG. 2.

Referring to FIG. 8, in operation 801, if selecting a plurality of temperature sensors for monitoring to control battery charging (e.g., operation 701 of FIG. 7), the electronic device may set priorities of the selected temperature sensors based on a charging type of the electronic device. For example, if selecting the third temperature sensor 260-3 and the fourth temperature sensor 260-4 based on the wired charging type, the charging module 210 (e.g., the control module 215) may set the priority of the third temperature sensor 260-3 associated with the charging module 210 under relatively severe heating to be higher than the fourth temperature sensor 260-4. For example, if selecting the first temperature sensor 260-1 through the fourth temperature sensor 260-4 based on the wireless charging type, the charging module 210 (e.g., the control module 215) may set the highest priority of the first temperature sensor 260-1 associated with the wireless charging coil 232 of relatively severe heating. Additionally, the charging module 210 (e.g., the control module 215) may set the priorities in order of the second temperature sensor 260-2, the fourth temperature sensor 260-4, and the third temperature sensor 260-3.

In operation 803, the electronic device may set a monitoring period of the temperature sensor to correspond to the priority of the temperature sensor. For example, the charging module 210 (e.g., the control module 215) may sequentially allocate different monitoring periods starting from the temperature sensor of the highest priority based on the priorities of the temperature sensors to monitor. For example, the different monitoring periods may be set at the same interval. For example, the charging module 210 (e.g., the control module 215) may set different intervals of the monitoring periods to correspond to the priorities of the temperature sensors to monitor. For example, as the priority of the temperature sensor increases, the charging module 210 may lengthen the monitoring period of the corresponding temperature sensor.

Figure 9:
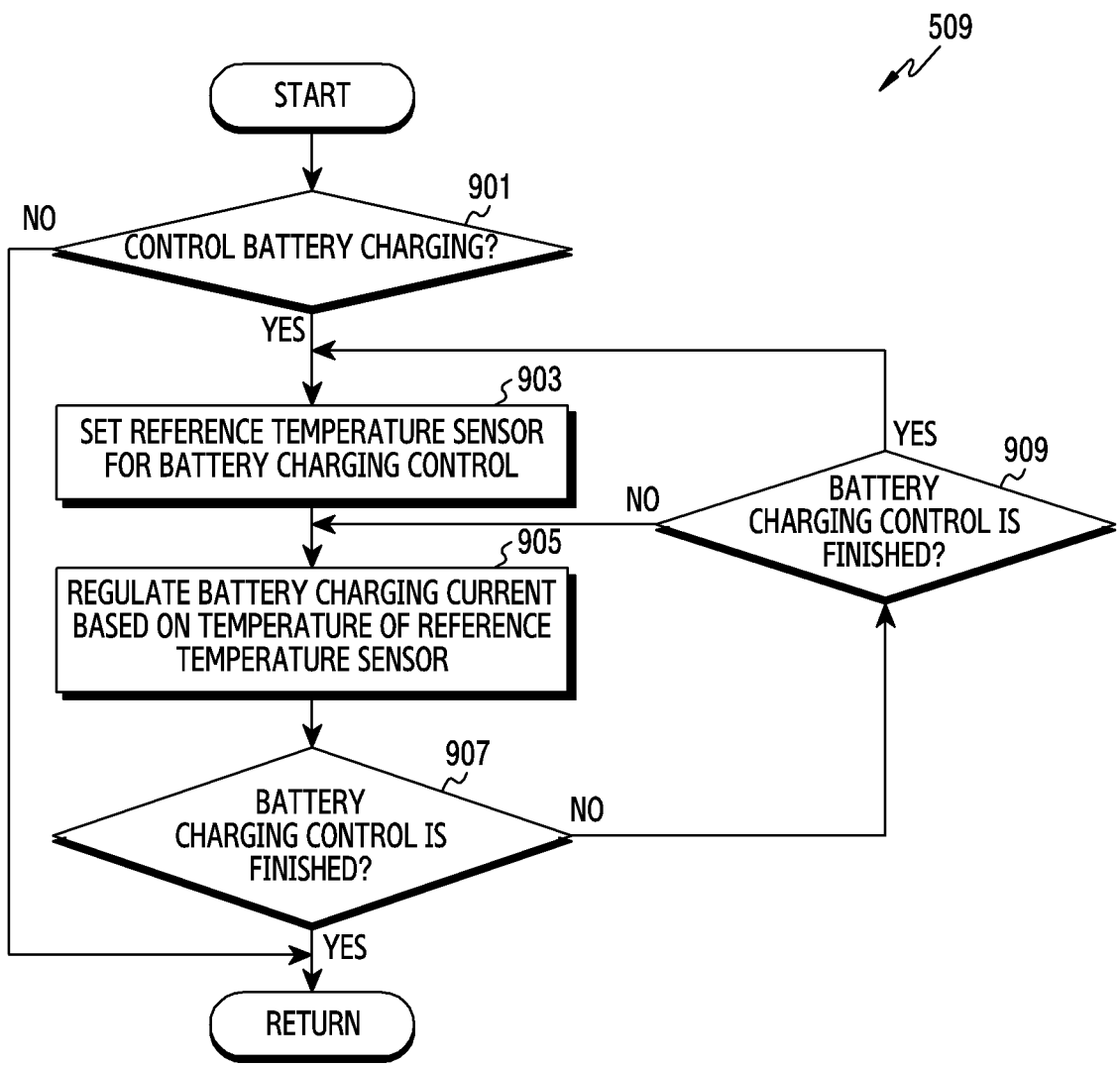
FIG. 9 illustrates a flowchart for setting a reference temperature sensor in a charging module according to various embodiments of the present invention.

FIG. 9 illustrates a flowchart for setting a reference temperature sensor in a charging module according to various embodiments of the present invention. The following describes operations for controlling the battery charging in operation 509 of FIG. 5. Hereafter, an electronic device may include the charging module 180 of FIG. 1 or the charging module 210 of FIG. 2.

Referring to FIG. 9, in operation 901, if monitoring at least one temperature sensor corresponding to a charging type (e.g., operation 507 of FIG. 5), the electronic device may identify whether the battery charging is controlled. For example, the charging module 210 (e.g., the control module 215) may identify whether a higher temperature than a control temperature which is matched to the temperature sensor is measured. For example, if a higher temperature than the control temperature is measured through the temperature sensor, the charging module 210 may determine that the charging of the battery 250 is controlled.

If controlling the battery charging, the electronic device may set a reference temperature sensor for the battery charging control in operation 903. For example, in the wired charging, the charging module 210 (e.g., the control module 215) may monitor the third temperature sensor 260-3 associated with the charging module 210 and the fourth temperature sensor 260-4 associated with the battery 250. If measuring a higher temperature than the control temperature through the third temperature sensor 260-3, the charging module 210 may set the third temperature sensor 260-3 as the reference temperature sensor. For example, if a plurality of temperature sensors measures a higher temperature than the control temperature which is matched to the temperature sensor, the charging module 210 (e.g., the control module 215) may set a temperature sensor of the highest surface temperature of the electronic device 201 corresponding to the temperature of the temperature sensor, as the reference temperature sensor.

In operation 905, the electronic device may regulate a battery charging current based on the temperature measured by the reference temperature sensor. For example, if measuring a higher temperature than the control temperature through the third temperature sensor 260-3, the charging module 210 (e.g., the control module 215) may decrease the charging current of the battery 250 in response to the temperature measured by the third temperature sensor 260-3. For example, the charging module 210 (e.g., the control module 215) may reduce the charging current of the battery 250 using at least one of the input control module 217, the output control module 219, or the battery path control module 240.

In operation 907, the electronic device may identify whether the battery charging control is finished. For example, the charging module 210 (e.g., the control module 215) may decrease the charging current of the battery 250 and identify whether the temperature measured at the temperature sensor falls below the control temperature matched to the temperature sensor. For example, if the temperatures measured through the temperature sensors monitored each are lower than the control temperature, the charging module 210 may determine that the battery charging control is finished.

In operation 909, if the battery charging control is not finished, the electronic device may determine whether to update the reference temperature sensor. For example, the charging module 210 may identify whether there is other temperature sensor which measures a higher temperature than the surface temperature of the electronic device 201 corresponding to the temperature of the reference temperature sensor while regulating the charging current of the battery 250. For example, if there is other temperature sensor which measures a higher temperature than the surface temperature of the electronic device 201 corresponding to the temperature of the reference temperature sensor, the charging module 210 may determine to update the reference temperature sensor. For example, the charging module 210 may identify whether there is a temperature sensor at which an abrupt temperature change is measured while regulating the charging current of the battery 250. For example, if there is a temperature sensor at which an abrupt temperature change is measured, the charging module 210 may determine to update the reference temperature sensor. For example, the abrupt temperature change may indicate that a slope of a temperature change graph exceeds a reference slope.

If not updating the reference temperature sensor, the electronic device may continuously regulate the charging current of the battery in operation 905.

If updating the reference temperature sensor, the electronic device may reset the reference temperature sensor for the battery charging control in operation 903. For example, in the wired charging, the charging module 210 (e.g., the control module 215) may monitor the third temperature sensor 260-3 and the fourth temperature sensor 260-4 in a corresponding period. The charging module 210 may regulate the charging current of the battery 250 based on the temperature measured through the third temperature sensor 260-3 which measures the temperature exceeding the control temperature. If the surface temperature of the electronic device 201 corresponding to the temperature of the fourth temperature sensor 260-4 is higher than the surface temperature of the electronic device 201 corresponding to the temperature of the third temperature 260-3 during the charging current control of the battery 250, the charging module 210 may set the fourth temperature sensor 260-4 as the reference temperature sensor. For example, the charging module 210 may regulate the charging current of the battery 250 based on the temperature measured by the fourth temperature sensor 260-4.

According to an embodiment, if the battery charging control is finished, the electronic device may restore the battery charging current which is decreased to respond to the heat of the electronic device, to the original charging current. For example, if the battery charging control is finished, the charging module 210 (e.g., the control module 215) may control to deactivate the input control module 217. For example, if the battery charging control is finished, the charging module 210 may deactivate an output current control function of the output control module 219 for the charging module 210. For example, if the battery charging control is finished, the charging module 210 may release the charging current blocking of the battery 250 through the battery path control module 240.

According to various embodiments of the present invention, an operating method of an electronic device may include identifying a battery charging type of the electronic device, selecting at least one temperature sensor among a plurality of temperature sensors disposed at positions in the electronic device based on the battery charging type, and controlling a charging current of the battery based on a temperature measured through the at least one temperature sensor.

According to various embodiments, identifying the battery charging type may include determining the battery charging type based on an interface of the electronic device connected with an external power device for the battery charging, wherein the interface may include at least one of a wired interface for wired connection or a wireless interface for wireless connection.

According to various embodiments, selecting the temperature sensor may include, if charging the battery based on a wired charging type, selecting at least one temperature sensor associated with the charging module of the electronic device among the plurality of the temperature sensors.

According to various embodiments, selecting the temperature sensor may include, if charging the battery based on a wireless charging type, selecting at least one temperature sensor associated with a wireless power module and the charging module of the electronic device among the plurality of the temperature sensors.

According to various embodiments, controlling the charging current of the battery may include, if selecting at least two temperature sensors based on the battery charging type, setting a monitoring period of each of the at least two temperature sensors, monitoring a temperature measured through a temperature sensor corresponding to each monitoring period, and controlling the charging current of the battery based on the monitoring result.

According to various embodiments, setting the monitoring period may include setting different monitoring periods for the at least two temperature sensors based on the battery charging type.

According to various embodiments, controlling the charging current of the battery may include, if measuring a temperature higher than a control temperature through the at least one temperature sensor, reducing the battery charging current.

According to various embodiments, controlling the charging current of the battery may include, if measuring a temperature higher than a control temperature through the at least one temperature sensor, reducing an input current of the charging module of the electronic device.

According to various embodiments, controlling the charging current of the battery may include, if measuring a temperature higher than a control temperature through the at least one temperature sensor, reducing an output current of the charging module of the electronic device.

According to various embodiments, controlling the charging current of the battery may include, if measuring a temperature higher than a control temperature through the at least one temperature sensor, blocking the battery charging current.

The term "module" used in this disclosure includes a unit including hardware, software, or firmware, and may be interchangeably used with, for example, terms such as logic, logical block, component, circuit, and the like. The "module" may be a minimum unit or its part for an integral component or for performing one or more functions. The "module" may be mechanically or electrically implemented, and include, for example, an application-specific integrated circuit (ASIC) chip, field-programmable gate arrays (FPGAs), and a programmable-logic device, which are known or will be developed to perform certain operations.

At least some parts of a device (e.g., modules or functions thereof) or a method (e.g., operations) according to various embodiments may be implemented with an instruction stored in a computer-readable storage medium (e.g., the memory 130) as a program module. If the instruction is executed by a processor (e.g., the processor 120), the processor may perform a function corresponding to the instruction. The computer-readable recording medium may include a hard disk, a floppy disc, a magnetic medium (e.g., a magnetic tape), an optical storage medium (e.g., a compact disc-ROM (CD-ROM) or a DVD, a magnetic-optic medium (e.g., a floptical disc)), and an internal memory. The instruction may include code created by a compiler or code executable by an interpreter. The module or program module according to various embodiments may further include at least one or more components of the aforementioned components, may omit some of them, or may further include additional other components.

The embodiments disclosed in this disclosure are presented for explanations and understanding of the technical disclosure, and are not intended to limit the scope of various embodiments of the present invention. Accordingly, the scope of various embodiments of the present invention is to be construed to include all changes or other various embodiments based on the technical spirit of various embodiments of the present invention.

We claim:

1. An electronic device comprising:
    a plurality of temperature sensors disposed at different positions in the electronic device;
    a battery;
    at least one processor; and
    a charging circuit coupled to the processor and configured to control charging of the battery,
    wherein the charging circuit is configured to:
        identify a charging type of the battery as at least one of wired charging or wireless charging,
        select at least one temperature sensor from among the plurality of the temperature sensors based on the identified charging type, wherein, based on the identified charging type including wired charging, one or more first temperature sensors are selected from among the plurality of temperature sensors, and, based on the identified charging type including wireless charging, one or more second temperature sensors are selected from among the plurality of temperature sensor, wherein the one or more second temperature sensors include at least one temperature sensor not included in the one or more first temperature sensors, and
        control a charging current of the battery based on a temperature measured through the selected at least one temperature sensor,
    wherein the plurality of temperature sensors includes a first temperature sensor associated with the charging circuit and a second temperature sensor associated with a wireless power module, and
    wherein the one or more first temperature sensors include the first temperature sensor, and the one or more second temperature sensors include the first temperature sensor and the second temperature sensor.

2. The electronic device of claim 1, wherein the charging circuit is configured to determine the charging type of the battery based on an interface connected to an external power device, and
    the interface comprises a wired interface for a wired connection and a wireless interface for a wireless connection.

3. The electronic device of claim 1, wherein the charging circuit is configured to, based on the selecting of at least one temperature sensor comprising selecting two more temperature sensors, set respective monitoring periods for each of the two or more temperature sensors, and monitor temperature measured through the two more temperature sensors for the corresponding monitoring periods.

4. The electronic device of claim 1, wherein the charging circuit is configured to, based on any one temperature sensor of the selected at least one temperature sensor measuring a temperature higher than a control temperature associated therewith, reduce the battery charging current.

5. The electronic device of claim 1, wherein the charging circuit is configured to, based on any one temperature sensor of the selected at least one temperature sensor measuring a temperature higher than a control temperature associated therewith, reduce an input current of the charging circuit or an output current of the charging circuit.

6. The electronic device of claim 1, wherein the charging module is configured to, based on any one temperature sensor of the selected at least one temperature sensor measuring a temperature higher than a control temperature associated therewith, block the battery charging current.

7. An operating method of an electronic device, comprising:
  identifying a battery charging type of the electronic device as at least one of wired charging or wireless charging;
  selecting at least one temperature sensor from among a plurality of temperature sensors disposed at positions in the electronic device based on the identified battery charging type, wherein, based on the identified charging type including wired charging, one or more first temperature sensors are selected from among the plurality of temperature sensors, and, based on the identified charging type including wireless charging, one or more second temperature sensors are selected from among the plurality of temperature sensor, wherein the one or more second temperature sensors include at least one temperature sensor not included in the one or more first temperature sensors; and
  controlling a charging current of the battery based on a temperature measured through the selected at least one temperature sensor,
  wherein the plurality of temperature sensors includes a first temperature sensor associated with the charging circuit and a second temperature sensor associated with a wireless power module, and
  wherein the one or more first temperature sensors include the first temperature sensor, and the one or more second temperature sensors include the first temperature sensor and the second temperature sensor.

8. The method of claim 7, wherein identifying the battery charging type comprises:
  determining the battery charging type based on an interface of the electronic device connected with an external power device for the battery charging,
  wherein the interface comprises a wired interface for a wired connection and a wireless interface for a wireless connection.

9. The method of claim 7, wherein controlling the charging current of the battery comprises:
  based on the selecting of at least one temperature sensor comprising selecting two or more temperature sensors, setting respective monitoring periods for each of the two or more temperature sensors;
  monitoring temperature measured through the two or more temperature sensors for the corresponding monitoring periods; and
  controlling the charging current of the battery based on the monitoring.

10. The method of claim 7, wherein controlling the charging current of the battery comprises:
  reducing the battery charging current based on any one temperature sensor of the selected at least one temperature sensor measuring a temperature higher than a control temperature associated therewith.

11. The method of claim 7, wherein controlling the charging current of the battery comprises:
  reducing an input current of a charging circuit of the electronic device or an output current of the charging module of the electronic device based on any one temperature sensor of the selected at least one temperature sensor measuring a temperature higher than a control temperature associated therewith.

12. The method of claim 7, wherein controlling the charging current of the battery comprises:
  blocking the battery charging current based on any one temperature sensor of the selected at least one temperature sensor measuring a temperature higher than a control temperature associated therewith.

* * * * *